United States Patent Office 3,348,589
Patented Oct. 24, 1967

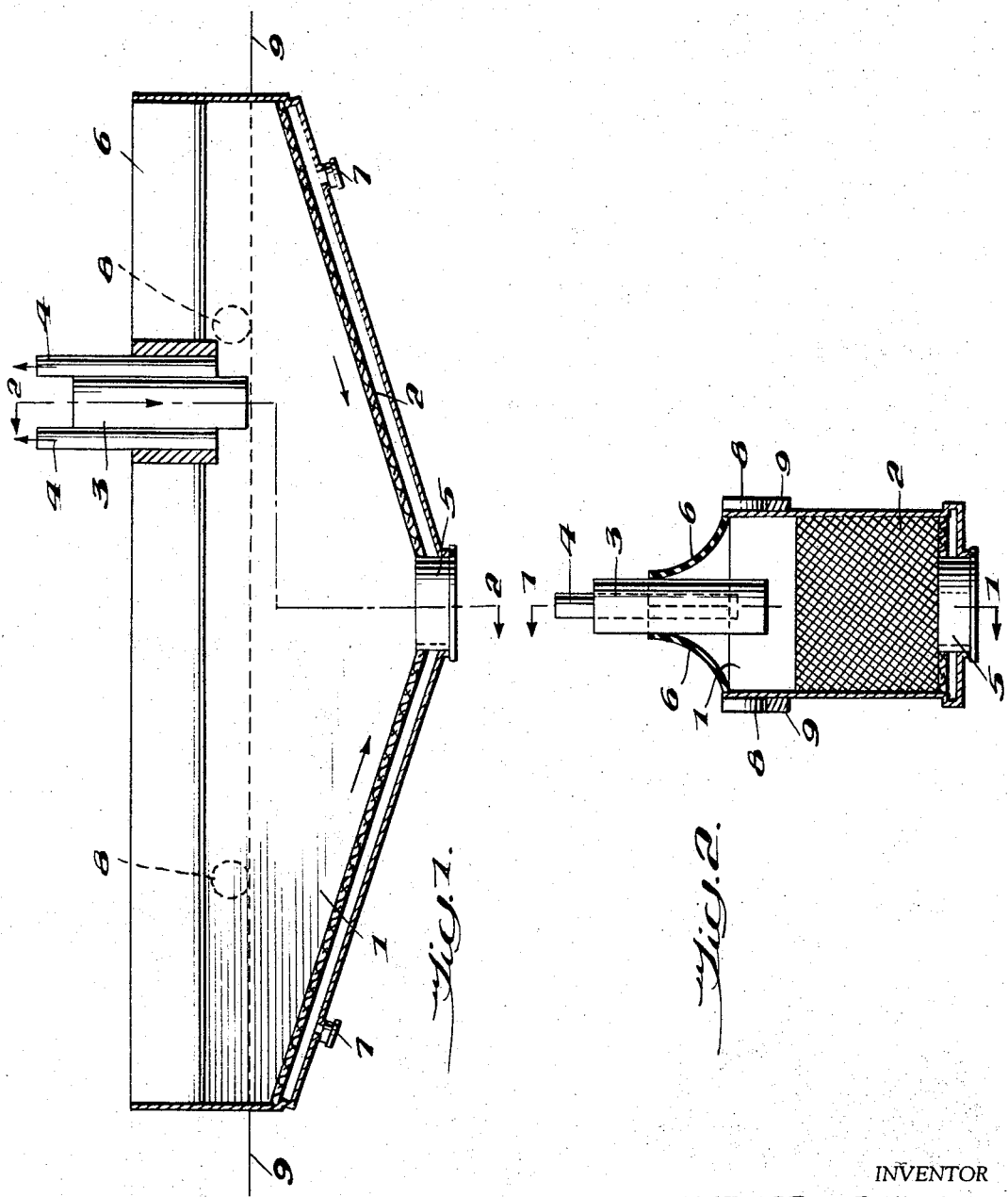

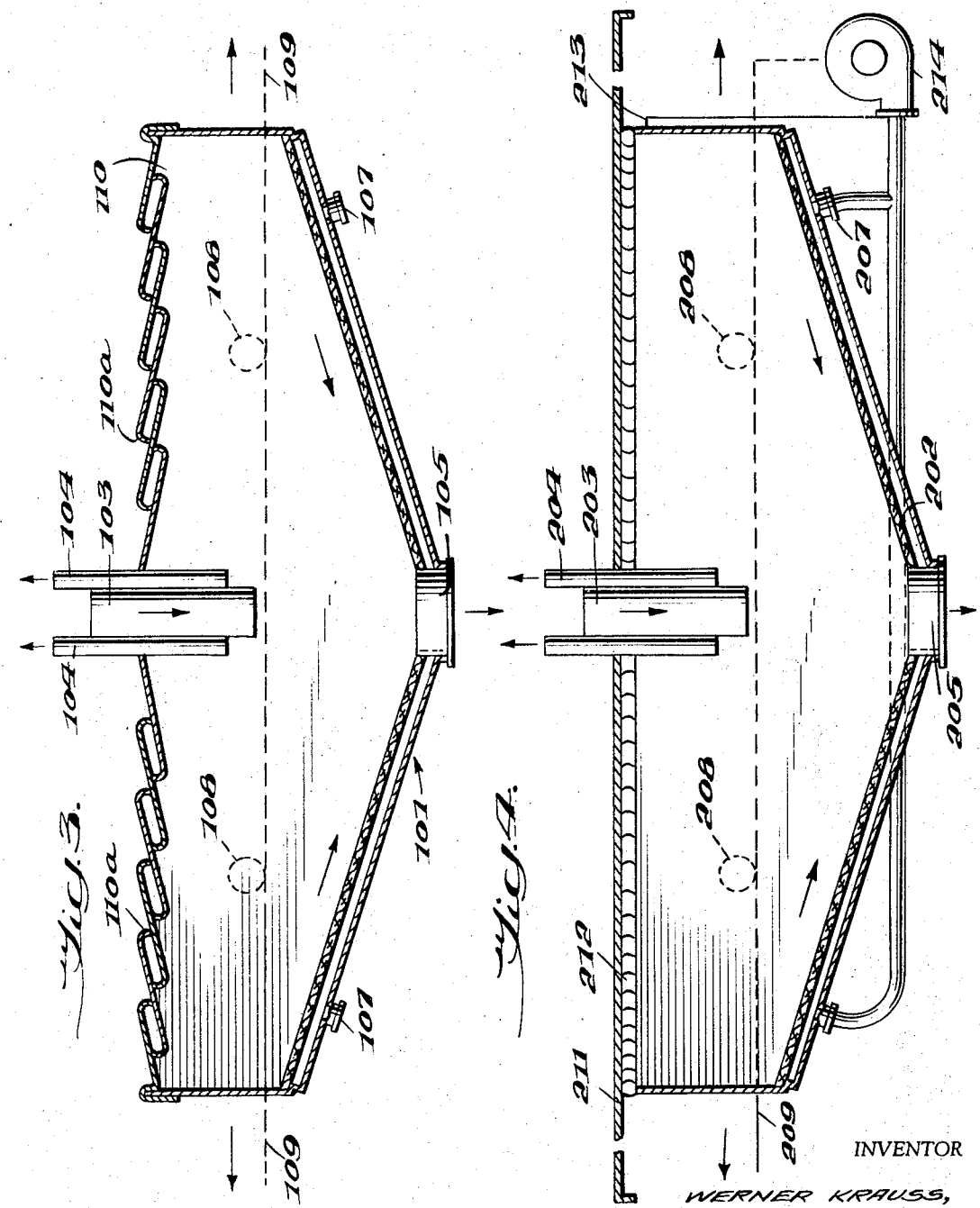

3,348,589
PNEUMATIC LOADING APPARATUS
Werner Krauss, Hamburg, Germany, assignor to Fuller Company, Catasauqua, Pa., a corporation of Delaware
Filed Mar. 10, 1965, Ser. No. 438,648
Claims priority, application Germany, Mar. 10, 1964
P 33,802
7 Claims. (Cl. 141—284)

The present invention relates to the loading of pulverulent or granular material into receivers and is more particularly concerned with the loading of mobile containers from a fixed storage vessel.

On the basis of efficiency, the bulk handling of pulverulent and granular materials, such as cement, has recently become more and more prominent. This is primarily due to the fact that, with bulk or loose loadings, comparatively larger capacities can be handled while, on the other hand, considerable costs for the sacking or bags can be saved. A predominant percentage of loose cement, for example, is loaded in so-called tanker-vehicles.

The receipt of cement in such trucks or vehicles is basically determined in that the "empty" and "filled" weights are taken, and the weight-difference serves as the basis for the pricing. An especially accurate system of weighing is guaranteed when the vehicle is positioned on a so-called pit-scale and simultaneous filling and weighing are possible. Under these circumstances, since such vehicles normally have either plural vessels or plural filling inlets, it may be difficult or impossible for the vehicle to move as required to position it for receiving material from the fill spout. In order to accommodate this, a loading apparatus is required which is itself capable of longitudinal movement.

For this purpose, special so-called linked-troughs or swivel spouts exist which meet the requirements of vehicles up to 36 feet and more, and provide satisfactory loadings. However, these installations often are found to be too expensive. Furthermore, it usually happens that they require a large amount of building height or overhead clearance.

In contrast, the present invention provides a vehicle loading unit which contemplates not only conveying simplicity but also lessened height. It is embodied as a trough assembly which is arranged beneath a stationary or fixed discharge port. The trough assembly includes an aerating deck leading to an outlet opening and is reciprocable in lengthwise alignment with the inlet positions of the vessels to be filled. The upper side of the trough is suitably sealed from the atmosphere.

A better understanding of the invention may be derived from the following description and the accompanying drawings, in which:

FIG. 1 is a longitudinal section of a preferred form of the invention;

FIG. 2 is a sectional view taken on lines 2—2 of FIG. 1;

FIG. 3 is a longitudinal-section of a modified form of the invention; and

FIG. 4 is a longitudinal section of another modified form of the invention.

As shown in FIGS. 1 and 2, the preferred form of the invention comprises a trough assembly 1 having aerating decks 2 therein which slope toward the middle and receive fluidizing air through an air conduit 7. Material is received in the trough via an inlet conduit or delivery spout 3 and is delivered along the aerating deck 2 to an outlet 5. Dust is released through a vent pipe 4.

The trough is supported for motion on wheels 8 engaging rails 9. The material delivery spout 3 and the vent pipe 4 are stationary, and the trough is moved back and forth under these until the fitting of the outlet 5 is aligned with the inlet of a tank vehicle.

The closing of the upper portion of the trough is accomplished through a special feature of the invention by means of flexible sealing flaps 6 which are secured to the trough edge and—with the exception of the point at which the delivery spout 3 projects through the slit between them and to the trough—seal against each other. During use of the trough, the flaps 6 open themselves automatically before the fixed delivery spout and close themselves behind it.

A very successful alternate form of the invention is shown in FIG. 3. The seal for the trough 101 comprises a closure which is formed of scale-like, overlapping and mutually sliding plates 110.

These plates 110 have curled lips 110a at their ends, by means of which the telescoping plates are interlocked, so that no leaks can occur between them. The first and last of these plates are secured to the trough and to the delivery spout, respectively.

As shown in FIG. 4, a seal which is very practical in usage includes a seal-plate 211 fixed against the delivery spout 203 above and extending over the reciprocating area of the trough. An inflatable hose 212, or the like, is secured about the edges of the trough between those edges and the seal-plate. The hose is supplied with air via a pipe 213 from the blower 214 serving the aerating deck 202.

Thus, an especially good seal is obtainable between the seal-plate 211 and the upper edges of the trough 201 (which is not in motion during actual filling of material). With this particularly advantageous arrangement, the seal-hose 212 is inflated as soon as the operation is started, since it receives air as soon as the blower and aeration deck are activated. When the air supply for unloading is stopped, the hose is then depressurized and the trough may be moved without interference from the seal.

Various changes may be made in the details of the invention without departing from the scope of the appended claims.

I claim:

1. Loading apparatus for conveying a pulverulent or granular material to a receiver, said loading apparatus comprising a movable housing having an outlet adapted to be aligned with said receiver, stationary means for delivering material to said housing, means mounting said housing for substantially horizontal reciprocation relative to said stationary means to position said outlet in alignment with the receiver, conveying means in said housing for delivering material to said outlet from horizontally remote portions of said housing and means for sealing between said stationary delivering means and said movable housing, to close the housing from the surrounding atmosphere.

2. The loading apparatus according to claim 1, in which said sealing means comprises a pair of flexible flaps closing said housing and extending parallel to the direction of reciprocation of said housing and positioned to receive the fixed inlet therebetween said flaps being in substantial sealing engagement with each other and with the stationary delivering means.

3. The loading apparatus according to claim 1, in which said sealing means includes a plurality of overlapping plates positioned in sealing and sliding relationship with each other.

4. The loading apparatus according to claim 1, in which said stationary sealing means includes a sealing plate overlying that area within which the housing is reciprocated, said stationary delivering means extending through said plate a seal member secured to said housing around its periphery and positioned between said housing and the seal plate and means for causing common sealing engagement of said seal member with both said housing and said seal plate.

5. The loading apparatus according to claim 4, in which said seal member is an inflatable member and said engagement means includes means for inflating the inflatable member.

6. The loading apparatus according to claim 5, in which said conveying means includes a gas permeable deck.

7. The loading apparatus according to claim 6 including means for supplying pressurized gas simultaneously to said aerated conveyor and said inflatable sealing member.

References Cited

UNITED STATES PATENTS

| | | | |
|---|---|---|---|
| 2,192,796 | 3/1940 | Moores et al. | 141—232 X |
| 2,675,274 | 4/1954 | Engelhart | 214—83.28 X |

FOREIGN PATENTS 94,585   6/1960   Netherlands.

LAVERNE D. GEIGER, *Primary Examiner.*

H. BELL, *Assistant Examiner.*